May 6, 1969 R. F. J. BROOM ET AL 3,443,109
ELECTRO-OPTICAL READING DEVICE UTILIZING A PULSED SEMICONDUCTOR DIODE LAMP
Filed Dec. 10, 1963
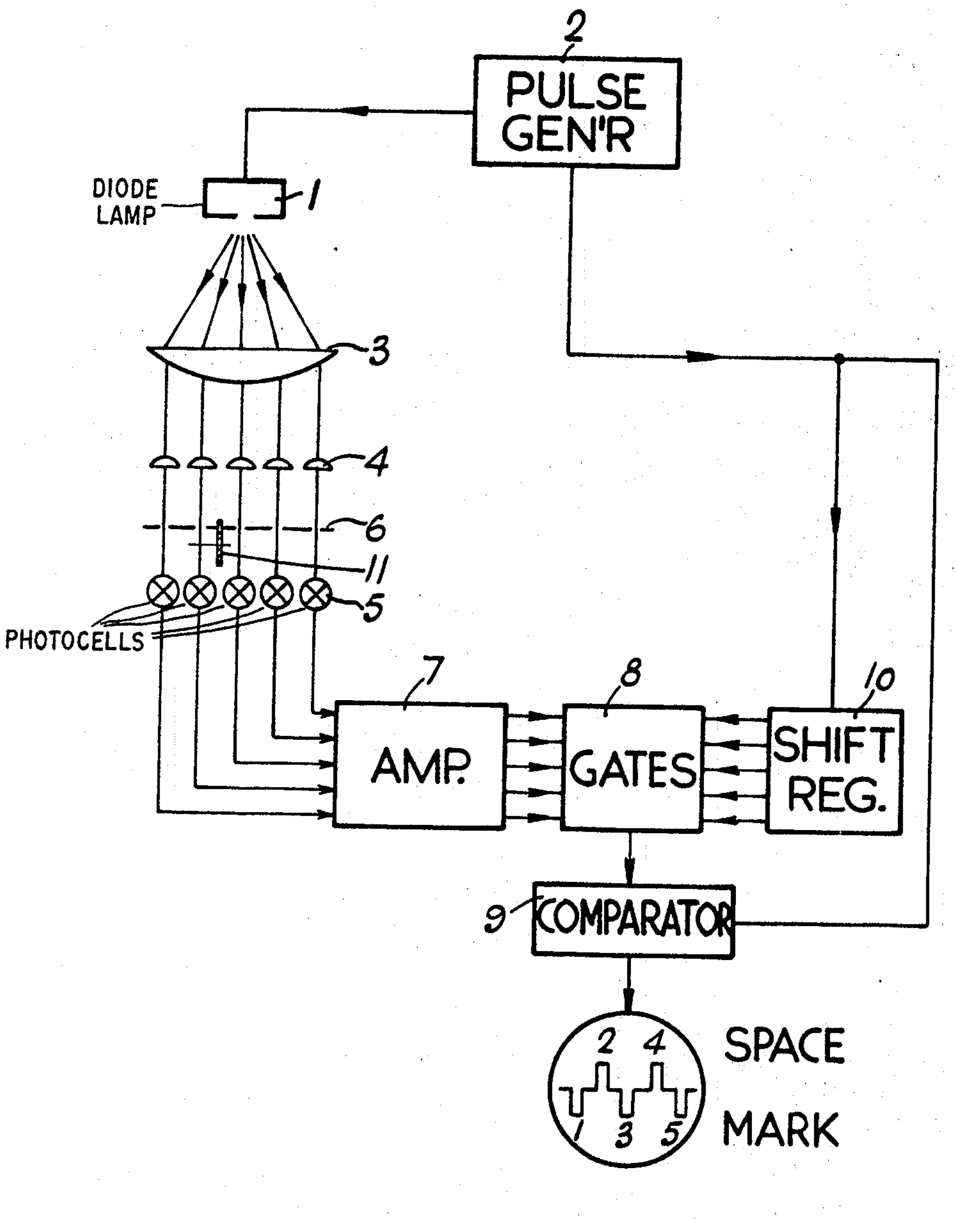
Inventors
Ronald Francis Johnston Broom
Cyril Hilsum
Donald Bayley
John Dennis Ralphs
By Cushman, Darby & Cushman
Attorneys United States Patent Office 3,443,109
Patented May 6, 1969

3,443,109

ELECTRO-OPTICAL READING DEVICE UTILIZING A PULSED SEMICONDUCTOR DIODE LAMP

Ronald Francis Johnston Broom and Cyril Hilsum, Baldock, and Donald Bayley and John Dennis Ralphs, Crowborough, England, assignors to National Research Development Corporation, London, England, a corporation of Great Britain Filed Dec. 10, 1963, Ser. No. 329,565
Int. Cl. H01j *39/12;* G01n *21/30;* H01s *3/00*
U.S. Cl. 250—217 3 Claims

ABSTRACT OF THE DISCLOSURE

An optical reader device including a pulsed semiconductor diode lamp focussed through an information bearing medium, such as a punched paper tape or encoder, onto a plurality of photocells, which read the tape by detecting changes in the radiation received as the information bearing member moves past the cells. The radiation detectors are gated by the pulse source so that they are sensitive to the modulated radiation.

This invention relates to optical reader devices, particularly for reading out the information stored in punched tape or punched cards and similarly coded information, for instance on a suitably perforated drum of a rotary position indicating mechanism or a coded perforated strip of a machine control mechanism.

According to the present invention an optical reader device comprises a semiconductor diode lamp, a pulse generator for energizing said diode by regularly spaced energizing pulses, each energizing pulse having a duration substantially less than the pulse repetition period to allow low duty cycle operation of said diode, focussing means for producing a beam of radiation of thin strip-like cross-section, means for enabling an information bearing member of a kind having a plurality of parallel channels each capable of containing information encoded thereon in the form of opaque and transparent areas to pass in a direction generally perpendicularly to the long cross-sectional dimension of the beam, and a corresponding plurality of radiation detectors positioned to receive the radiation of the focussed beam which passes through transparent areas in the channels.

According to a further feature of the invention the energising supply to the semiconductor diode lamp is pulsed D.C. or A.C. of audio frequency or radio frequency. This greatly eases the problem of subsequently amplifying the photocell outputs.

In order that the invention may be more fully understood reference will now be made to the accompanying drawing the single figure of which illustrates in block diagrammatic form a tape reader device embodying the invention.

Referring to the figure there is shown therein a semiconductor diode lamp 1 which is energised by current pulses supplied from a pulse generator 2. Due to the ability of lamp 1 to be modulated at high frequencies the radiation output from lamp 1 is pulsed in corresponding manner to the current pulse input. This pulse modulated beam of radiation is focussed by means of a lens 3 to form a beam of this strip-like cross-section. This beam passes through a series of five apertures 5 positioned along the long cross-sectional dimension of the beam and these apertures can include further lenses which focus the five separate rays that are now produced on to an array 5 of photocells sensitive to the wavelength of the radiation emitter from diode lamp 1. Between the line of apertures 4 and the photocells 5 there is arranged to be interposed a member 6 such as a perforated tape or card which carries information encoded thereon in the form of punched holes. Means are provided for enabling member 6 to be driven in a direction perpendicular to the long cross-sectional dimension of the beam. In the case of punched tape such means can comprise a line of perforations extending longitudinally of the tape in which a driven sprocket wheel 11 engages. The punched holes in member 6 lie along five parallel channels extending in the direction of drive of the member.

The outputs from the array 5 of photocells are fed to a five channel amplifier 7 each channel being sensitive to the pulsed output of pulse generator 2. The presence or absence of a signal in any channel of amplifier 7 at any instant while the member is in motion will depend on whether or not there is a corresponding punched hole in the member 6 lying in the ray of radiation from apertures 4 corresponding to that particular channel.

In order to have the information derived from member 6 in the form of a continuous stream of pulses with, say, negative pulses for holes and positive pulses for no holes the outputs from the amplifier 7 can be fed in turn through gates 8 to a comparator 9. Here the amplified photocell signals are compared with drive pulses coming directly from pulse generator 2. The amplifier output pulses are arranged to be about twice as large as the drive pulses and of opposite sign so that when no signal is developed by a particular photocell the drive pulse fed directly from pulse generator 2 to comparator 9 gives rise to a corresponding pulse at the output of the comparator. If there is a hole in front of the photocell a pulse of equal magnitude but opposite sign is produced from comparator 9. Selection of each channel of amplifier 7 in turn is obtained by controlling gates 8 from a shift register 10 which produce a sequence of gate control pulses for the gates 8 for each pulse obtained from pulse generator 2.

The semiconductor lamp can comprise a p-n junction diode formed of gallium arsenide or indium phosphide or an alloy of both, or an alloy of gallium arsenside or gallium phosphide, zinc being diffused into the surface of the semiconductor to form the p-n junction. In a practical construction the p-n junction diode lamp comprises a slice of semiconductor material having zinc diffused into its surface to form the p-n junction and mounted over an aperture or window in a disc of about 3 mm. diameter of gold plated molybdenum, and a gold plated molybdenum stud of 1 mm. diameter is alloyed to the top surface of the semiconductor. The surface around the stud is then etched away to leave the stud on an island of doped semiconductor. The stud and disc form ohmic contacts to the p-n junction and when a suitable voltage is applied in the forward direction infra-red radiation is emitted through the central window of the disc for focussing by lens system 3 on to the array of photocells 5. The photocells can comprise silicon photocells which are sensitive to infrared radiation of the wavelength emitted by gallium arsenide diode lamps.

Pulse generator 2 can comprise an astable multivibrator circuit arranged to provide trigger pulses which trigger a monostable flip-flop circuit. The output pulses from the monostable circuit can conveniently have a duration of 150 microseconds and a pulse repetition frequency of 10 c.p.s. However the pulse repetition frequency can readily be raised as desired to 1 gc./s. or more. These pulses are fed through an emitter follower stage to a power transistor the collector load of which include lamp 1. The magnitude of the current pulses through the lamp should be restricted to about 2 a.

Since the diode lamp is essentially a point source the focussing optical system can be exact and does not need to allow for an indefinite, relatively large area of light source, as when a metal filament is used, whilst, since similar diode lamps have the illuminated area in exactly the same position, any substitution of another lamp does not involve re-focussing or position adjustment.

One great advantage of the diode lamps over the more usual metal filament lamps in this connection is that when the p-n junction diode lamps are modulated or pulsed, amplification of the photocell outputs can be effected by ordinary A.C. amplifiers and avoiding the need for any D.C. amplification. The modulated or pulsed operation of a diode lamp allows a low duty cycle and low mean power dissipation, which gives less heating and enables a very compact arrangement to be used, compared with a tungsten filament lamp, whilst the small size and weight of the diode lamp means that it is much more robust than a tungsten filament lamp. The diode lamp is also capable of low voltage operation, which again gives less heating effect than a filament lamp.

Another great advantage of the p-n junction diode lamp compared with the use of a tungsten filament lamp is that stray light and reflections from punched paper tape or cards limits the contrast ratio obtainable under favorable conditions with a metal filament lamp to a value of about 20 to 1, whereas with a p-n junction diode lamp the contrast ratio obtainable is greater than 500 to 1, and even with translucent material the ratio is still as great as 16 to 1 although a conventional system would be quite inoperable with such material. The contrast ratio is the ratio of radiation received by a detecting photocell in the presence of a relatively transparent portion of the information bearing member (such as a hole in the punched tape) to the radiation received in the presence of a relatively opaque portion of the member, and by focussing the radiation from the diode lamp on the photocells, so that radiation scattered off the optical axis is not received by the photocell, the contrast ratio is increased.

The use of a p-n junction diode lamp also enables the speed of read out to be enormously increased over that obtainable with conventional systems. For example, one factor which allows this increased speed is that the improved contrast ratio of the present invention enables smaller holes to be used in paper tape so that information can be read out at a greater speed for a given speed of transport of the tape.

We claim:

1. An optical reader device comprising:
a semiconductor diode lamp,
a pulse generator for energizing said diode by regularly spaced energizing pulses, each energizing pulse having a duration substantially less than the pulse repetition period to allow low duty cycle operation of said diode,
focussing means for producing a beam of radiation of thin strip-like cross-section,
means for enabling an information bearing member of a kind having a plurality of parallel channels each capable of containing information encoded thereon in the form of opaque and transparent areas to pass in a direction generally perpendicularly to the long cross-sectional dimension of the beam, and
a corresponding plurality of radiation detectors positioned to receive the radiation of the focussed beam which passes through transparent areas in the channels.

2. The device as claimed in claim 1 including: a plurality of pulse amplifiers arranged to amplify the outputs of said photocells, which amplifiers are sensitive to the pulse repetition frequency of said pulse generator.

3. An optical reader device comprising:
a semiconductor diode lamp;
a pulse source for energizing said diode lamp;
a plurality of radiation detectors;
focussing means for focussing radiation from said diode lamp to produce a beam of radiation which has a thin strip-like cross-section and which is focussed on said detectors;
an information bearing member having a plurality of parallel channels corresponding to said plurality of radiation detectors and each containing information encoded thereon in the form of substantially opaque and transparent areas; and
means for translating said information bearing member between said diode lamp and said radiation detectors in a direction generally perpendicular to the long cross-sectional dimension of said focussed beam, each of said radiation detectors being positioned to receive the focussed radiation from said diode lamp which passes through transparent areas in the associated channel of said information bearing member, but to receive a substantially reduced amount of said radiation when said focussed beam is interrupted by substantially opaque portions of said information bearing medium.

References Cited

UNITED STATES PATENTS

| | | | |
|---|---|---|---|
| 2,872,589 | 2/1959 | Sliter. | |
| 3,020,534 | 2/1962 | Jones. | |
| 3,036,765 | 5/1962 | Jones et al. | |
| 3,065,356 | 11/1962 | Blake et al. | |
| 3,111,587 | 11/1963 | Rocard | 260—217 X |
| 3,124,675 | 4/1964 | Epstein | 250—219 |
| 3,293,513 | 12/1966 | Biard et al. | |

RALPH G. NILSON, *Primary Examiner.*

T. N. GRIGSBY, *Assistant Examiner.*

U.S. Cl. X.R.

250—211, 219; 331—94.5